(12) United States Patent
Wang et al.

(10) Patent No.: US 10,462,719 B2
(45) Date of Patent: Oct. 29, 2019

(54) METHOD, DEVICE AND SYSTEM FOR SUPPORTING TRANSMISSION OF A GROUP SERVICE

(71) Applicant: Samsung Electronics Co., Ltd., Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd (KR)

( * ) Notice: Subject to any disclaimer, the term of this patent is extended or adjusted under 35 U.S.C. 154(b) by 150 days.

(21) Appl. No.: 15/114,015

(22) PCT Filed: Jan. 26, 2015

(86) PCT No.: PCT/KR2015/000787
§ 371 (c)(1),
(2) Date: Jul. 25, 2016

(87) PCT Pub. No.: WO2015/111974
PCT Pub. Date: Jul. 30, 2015

(65) Prior Publication Data
US 2016/0345225 A1    Nov. 24, 2016

(30) Foreign Application Priority Data
Jan. 24, 2014 (CN) ............. 2014 1 0035852

(51) Int. Cl.
*H04W 36/08* (2009.01)
*H04W 4/10* (2009.01)
(Continued)

(52) U.S. Cl.
CPC ............. *H04W 36/08* (2013.01); *H04W 4/08* (2013.01); *H04W 4/10* (2013.01); *H04W 8/08* (2013.01);
(Continued)

(58) Field of Classification Search
None
See application file for complete search history.

(56) References Cited

U.S. PATENT DOCUMENTS 9,432,900 B2 * 8/2016 Lee ..................... H04W 4/06
2010/0110961 A1 5/2010 Chao et al.
(Continued)

OTHER PUBLICATIONS

PCT/ISA/210 Search Report issued on PCT/KR2015/000787 (pp. 5).

*Primary Examiner* — Saba Tsegaye
(74) *Attorney, Agent, or Firm* — The Farrell Law Firm, P.C.

(57) ABSTRACT

The present invention provides a method for supporting transmission of a group service, which includes: a MCE sends a pending notification message to a MME, wherein the pending notification message includes an identity (TMGI) of a GCSE service; and the MME sends the pending notification message to a GCSE server or a BM-SC. The present disclosure also provides a system for supporting transmission of the group service, a method for establishing a GCSE data bearer and a base station. By adopting the present disclosure, the risk of data loss due to a change of the data bearer is reduced, time delay of establishing the data bearer is reduced, air interface resource is effectively utilized, and power consumption of A UE is saved.

4 Claims, 8 Drawing Sheets

(51) Int. Cl.
*H04W 8/08* (2009.01)
*H04W 4/08* (2009.01)
*H04W 76/40* (2018.01)
*H04W 76/27* (2018.01)
*H04W 36/00* (2009.01)

(52) U.S. Cl.
CPC ....... *H04W 36/0009* (2018.08); *H04W 76/27* (2018.02); *H04W 76/40* (2018.02); *Y02D 70/1224* (2018.01); *Y02D 70/1242* (2018.01); *Y02D 70/1262* (2018.01)

(56) References Cited

U.S. PATENT DOCUMENTS

| | | | |
|---|---|---|---|
| 2010/0240375 A1* | 9/2010 | Ahluwalia | H04L 5/0053 455/439 |
| 2011/0305184 A1* | 12/2011 | Hsu | H04L 65/4076 370/312 |
| 2012/0302240 A1 | 11/2012 | Tamaki et al. | |
| 2013/0155871 A1 | 6/2013 | Zhu et al. | |
| 2013/0215761 A1 | 8/2013 | Xu et al. | |
| 2013/0324129 A1 | 12/2013 | Lee et al. | |
| 2014/0112236 A1* | 4/2014 | Jung | H04W 76/40 370/312 |
| 2015/0230142 A1* | 8/2015 | Yang | H04W 36/00 370/331 |
| 2016/0037398 A1* | 2/2016 | Li | H04W 36/0055 455/436 |
| 2016/0316398 A1* | 10/2016 | Han | H04W 36/0055 |

\* cited by examiner

METHOD, DEVICE AND SYSTEM FOR SUPPORTING TRANSMISSION OF A GROUP SERVICE

PRIORITY

This application is a National Phase Entry of PCT International Application No. PCT/KR2015/000787 which was filed on Jan. 26, 2015, and claims priority to Chinese Patent Application No. 201410035852.4, which was filed on Jan. 24, 2014, the contents of each of which are incorporated herein by reference.

TECHNICAL FIELD

The present invention relates to wireless communication technologies, and more particularly, to a method, a device and a system for supporting transmission of a group service thereof.

BACKGROUND ART

Figure 1:
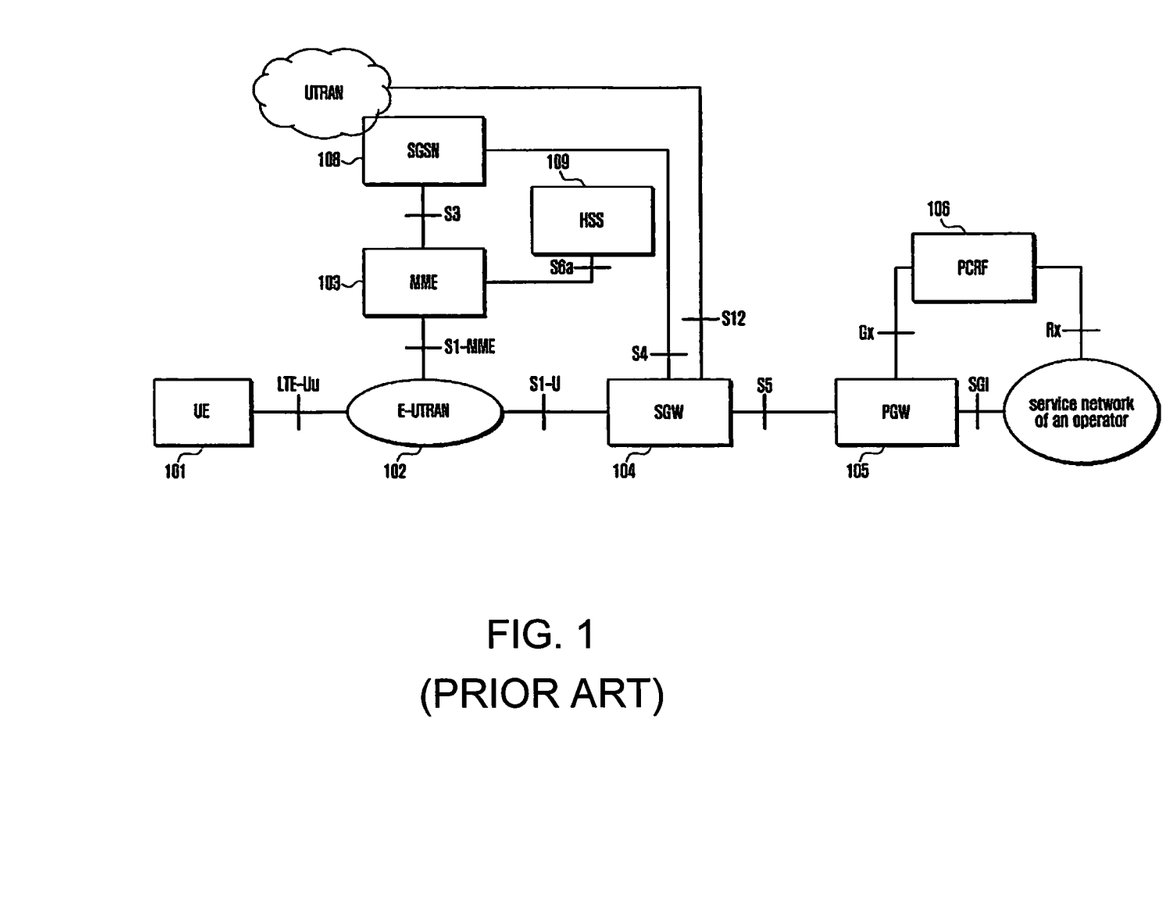
FIG. 1 is an architecture diagram of an existing LTE system.

Modern mobile communication tends to provide a user with a high-speed transmission multimedia service. FIG. 1 shows a diagram of a long term evolution (LTE) system architecture.

In FIG. 1, a user equipment (UE) 101 is a terminal device for receiving data. An evolved universal terrestrial radio access network (E-UTRAN) 102 is a radio access network, including a macro base station (eNodeB/NodeB) that provides an interface for the UE to access a wireless network. A mobility management entity (MME) 103 is responsible for management of a mobile context, a session context, and security information of the UE. A serving gateway (SGW) 104 mainly provides a user plane function, which may be in a same physical entity as the MME 103. A packet data network gateway (PGW) 105, responsible for charging, lawful interception, etc, may be in the same physical entity as the SGW 104. A policy and charging rules function (PCRF) 106 provides a policy of quality of service (QoS) and a charging rule. A general packet radio service supporting node (SGSN) 108 is a network-node device which provides routing for data transmission in a universal mobile telecommunications system (UMTS). A home subscriber server (HSS) 109 is a home subsystem of the UE which is responsible for protecting user information that includes current location of the user equipment, an address of a serving node, user security information, a packet data context of the user equipment, and so on.

An object of a group communication service is to provide a quick and efficient mechanism and distribute same data to users in a group. A concept of the group communication has been widely used in a land mobile radio (LMA) system of a public security organization. A typical application is to provide a function of "push to talk" (PTT). When the group communication service is introduced into LTE, the group communication service in LTE at least supports a PTT voice call, and its performance is comparable to traditional group communication PTT performance. A group communication service in SAE needs to support the UEs in different states and different surroundings of the UEs. There is wideband data transmission in LTE, so the group communication service in LTE needs to support data communication such as voice, video, etc.

Group call system enabler (GCSE) in LTE means that a function of an application layer is introduced into 3GPP to support group communication. Users in LTE are divided into different groups. One user may belong to one GCSE group or a plurality of different GCSE groups. The user in the GCSE group that needs to receive GCSE service data is called a receiving group member, and the user for sending the service data is called a sending group member. The group communication is the communication between the sending group member and the receiving group member. In addition, it is also required to support the user to communicate with multiple groups at the same time. For example, the user makes a voice communication with a group, and makes a video communication or other data communication(s) with another group.

Figure 2:
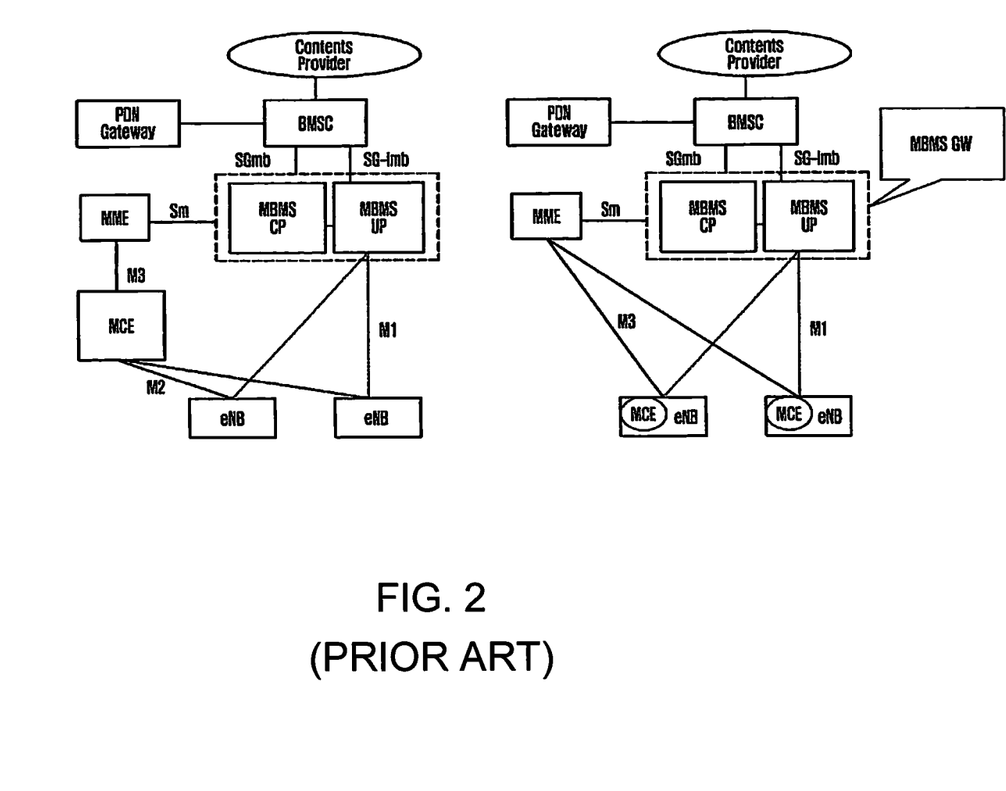
FIG. 2 is an architecture diagram of an existing eMBMS.

In order to utilize air interface resource effectively, in the case that multiple receiving users receive a same data service, the date service is provided to the user by adopting a broadcast and multicast way. Such service is called a multimedia broadcast and multicast service (MBMS). Each MBMS bearer provides the service in its own service area. In each cell of the service area, there is a dedicated control channel (MCCH) to transmit a MBMS signal. BM-SC is a center providing the multimedia broadcast and multicast service. MBMS data is sent from the BM-SC to MBMS-GW located between the BM-SC and an eNB that is a logical node or other network node. The MBMS-GW is responsible for sending/broadcasting a MBMS data packet to each eNB that is required to transmit the data. The MBMS-GW sends the MBMS data packet to a corresponding eNB which sends data to the user. A control signal is sent from the BM-SC to the MBMS-GW, and then sent to the EUTRAN through the MME. A MCE is a node of the EUTRAN, which receives the MBMS signal, determines to use a MBSFN transmission mode, and then sends the signal to the corresponding eNB. FIG. 2 is a schematic architecture diagram of an eMBMS. The MCE may be a single node, or together with the base station. The MBMS for LTE is called the eMBMS for short.

An eMBMS service may be transmitted in a single-carrier cell, so that different cells use different carriers, a cell-edge user can only listen to a current MBMS service of the cell. However, when a neighboring cell transmits a same MBMS service with a same carrier synchronously, the user in neighboring cell edge may receive a sum of the two signal energy. Therefore, in a prior art, a continued area is defined. In this area, each eNB transmits the same MBMS with the same carrier in the synchronous way to improve MBMS service receiving quality. The continued area is called a single frequency network (SFN) area which includes a group of cells whose geographic locations are continuous. These cells transmit a certain MBMS service in synchronization by using a same radio resource.

A GCSE service may be transmitted through an eMBMS bearer, but it can not meet requirements of the GCSE service just by using the existing eMBMS technology. For example, a data bearer is established with 300 ms as required by the GCSE service, but in the eMBMS technology, the MCE needs to transmit the signal to all eNBs within a scope of the MBSFN first, and then the eNBs transmit MBMS control information synchronously in the air interface. Required time in this process exceeds that of the GCSE service. Currently, two methods have been proposed to solve the problem. In the first method, the eMBMS bearer is established in advance. In the second method, a point to point bearer is established in the network first, and the data is sent to the receiving group member through the point to point bearer. At the same time, the eMBMS bearer begins to be established, and after the eMBMS bearer is successfully established, the data is sent to the receiving group member through the eMBMS bearer. Within a period of time, the data is sent on the point to point bearer and the eMBMS bearer simultaneously.

Although the above method can solve the time-delay problem of bearer establishment, based on analysis, it is discovered that the following problems need to be solved.

1) In a current eMBMS system, the eMBMS system is just used to send the MBMS service. When the service starts, the MCE may count the number of users, and determine whether to suspend or resume the data transmission according to the number of users. Specifically, when the number of users is less than a threshold value, the MCE determines to suspend the data transmission, so as to save the air interface resource and power consumption of the UE. Thus, the UE is unable to receive the eMBMS control signal and data. When the eMBMS system is used to transmit the GCSE service, the UE needs to establish a point to point channel for the GCSE service. In the establishment process, the UE cannot receive the data, which leads to interruption of the data transmission.

2) When the GCSE service needs to use the eMBMS bearer for transmission, a GCSE server can not whether the MCE has determined to suspend the data transmission.

3) Currently, only the MCE can make a decision to resume the MBMS data transmission.

4) A node is need to determined whether to send the CGSE service to the receiving group user through the point to point bearer or the MBMS bearer, and when to switch between the two bearers.

5) When the UE moves into a new cell, and the GCSE service is not provided by the new cell through the MBMS, the UE needs to establish the point to point bearer in the new cell, which leads to interruption of the data transmission.

6) When the UE moves into a new cell, and the GCSE service is provided by the new cell through the MBMS, the UE needs to listen to broadcast information, and then listen to the MBMS control information, so the UE can receive the GCSE service data, which leads to interruption of the data transmission.

DISCLOSURE OF INVENTION

Technical Problem

When the UE moves into a new cell, and the GCSE service is not provided by the new cell through the MBMS, the UE needs to establish the point to point bearer in the new cell, which leads to interruption of the data transmission.

When the UE moves into a new cell, and the GCSE service is provided by the new cell through the MBMS, the UE needs to listen to broadcast information, and then listen to the MBMS control information, so the UE can receive the GCSE service data, which leads to interruption of the data transmission.

Solution to Problem

A method for supporting transmission of a group service provided by the present disclosure includes:
receiving, by a MME, a pending notification message from a MCE, wherein the pending notification message includes an identity (TMGI) of a GCSE service; and
sending, by the MME, the pending notification message to a GCSE server or a MBMS server (BM-SC).
Preferably, the method further includes:
informing, by the GCSE server or the BM-SC, the MME to transmit GCSE data on a point to point bearer; or
informing, by the BM-SC, the MME to transmit GCSE data on a point to point bearer through the GCSE server.

Preferably, a process of informing, by the GCSE server or the BM-SC, the MME to transmit GCSE data on a point to point bearer includes:
sending, by the GCSE server or the BM-SC, the MME a message of starting point to point transmission including a group communication identity of the GCSE service when the point to point bearer of the GCSE service has been established; and
sending, by the GCSE server or the BM-SC, the MME a request for establishing the point to point bearer when the point to point bearer of the GCSE service is not established, wherein the request includes a group communication identity and QoS information of the GCSE service, and initiating, by the MME, a process of establishing the point to point bearer.

Preferably, after sending, by the GCSE server or the BM-SC, the MME a message of starting point to point transmission, the method further includes:
forwarding, by the MME, the message of starting point to point transmission to a base station, and scheduling, by the base station, air interface resource for a UE, and sending, by the base station, data of the GCSE service through the point to point bearer; or
sending, by a S-GW, obtained data of the GCSE service to a base station, and scheduling, by the base station, an air interface resource for a UE, and sending, by the base station, data of the GCSE service through the point to point bearer.

Preferably, the method may further include:
sending, by the GCSE server, an indication message of restarting MBMS transmission to the MME, and sending, by the MME, the MCE the message including an indication of retransmission of a group communication identity of the GCSE service, and configuring, by the MCE, MBMS control information for a base station; or
sending, by a MME server, an indication message of restarting MBMS transmission to the MCE, and configuring, by the MCE, MBMS control information for a base station, wherein the message includes an indication of retransmission of a group communication identity of the GCSE service.

Preferably, the group communication identity of the GCSE service is the TMGI of the GCSE service.

Preferably, the pending notification message further includes a MBSFN identity or a SAI list.

A system for supporting transmission of a group service provided by the present disclosure includes a MCE, a MME and a GCSE server, or a MCE, a MME and a MBMS server (BM-SC), where:
the MCE is configured to send a pending notification message to the MME, wherein the pending notification message includes an identity (TMGI) of a GCSE service; and
the MME is configured to send the pending notification message to the GCSE server or the MBMS server (BM-SC).

Preferably, the GCSE server or the BM-SC is configured to inform the MME to transmit MBMS data on a point to point bearer; or
the BM-SC is configured to inform the MME to transmit GCSE data on a point to point bearer through the GCSE server.

A method for supporting transmission of a group service provided by the present disclosure includes:
receiving, by a MCE, a MBMS starting message, wherein the MBMS starting message including an indication of not starting user statistics function is sent to the MCE by a BM-SC through a MBMS-GW and a MME; and disabling, by the MCE, the user statistics function.

A method for establishing a bearer of GCSE data provided by the present disclosure includes:

sending, by a source base station, a handover request to a destination base station, wherein the handover request carries a group communication identity established by a UE on the source base station and bearer information of the group communication;

receiving, by the source base station, the group communication identity and bear configuration information from the destination base station; and sending, by the source base station, a RRC reconfiguration message to the UE, wherein the RRC reconfiguration message includes the bearer configuration information of the group communication.

Preferably, the group communication identity is a GCSE Group Id or a TMGI.

Preferably, the bearer information of the group communication sent to the destination base station by the source base station is a MBSFN identity if the source base station sends service data of the group communication on a MBMS bearer; and the bearer information of the group communication sent to the destination base station by the source base station includes a bearer identity if the source base station sends service data of the group communication on a point to point bearer.

Preferably, the bear configuration information received by the source base station from the destination base station includes broadcast information for configuring a MCCH and MBMS control information transmitting on the MCCH if the destination base station sends service data of the group communication by using MBMS bearer.

A base station provided by the present disclosure includes a first module, a second module and a third module, wherein:

the first module is configured to send a handover request to a destination base station, wherein the handover request carries a group communication identity established by a UE on the base station and bearer information of the group communication;

the second module is configured to receive the group communication identity and bear configuration information from the destination base station; and the third module is configured to send a RRC reconfiguration message to the UE, wherein the RRC reconfiguration message includes the bearer configuration information of the group communication.

Advantageous Effects of Invention

The present disclosure provides a method, a device and a system for supporting transmission of a group service, so as to reduce the risk of data loss caused by a change of a data bearer, reduce time delay of establishing the data bearer and the risk of data loss caused by UE mobility, improve air interface resource utilization and save power consumption of the UE.

MODE FOR THE INVENTION

To illustrate the object of the present invention, technical solutions and advantages more clearly, detailed description of the present invention will be given blow with reference to the accompanying drawings and embodiments.

A main idea of the present disclosure is that when determining to suspend MBMS data transmission, a MCE informs a GCSE server or a MME of a pending decision, obtains information reported by a wireless access node through the GCSE server or the MME, and determines a bearer of sending GCSE data. According to the technical solution provided by the present disclosure, it is able to reduce the risk of data loss due to a change of the data bearer, reduce the time delay of establishing the data bearer, use the air interface resource effectively, and save the power consumption of the UE.

Figure 3A:
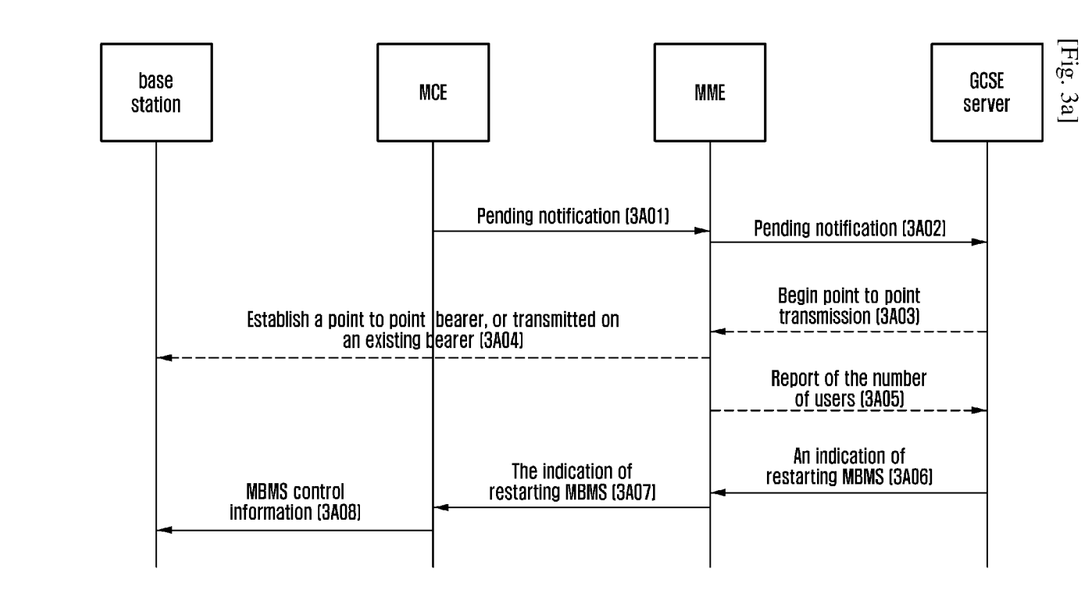
FIG. 3A is a schematic flowchart of a method for supporting transmission of a group service of the present disclosure.

FIG. 3A is a schematic flowchart of a method for supporting transmission of a group service of the present disclosure. A process shown in FIG. 3A may include following steps:

In step 3A01, the MCE sends a pending notification message to the MME, to inform the MME to suspend data transmission on a MBMS bearer.

The MCE counts the number of users that receives data in a MBSFN area. When the number of the users is less than a threshold, the MCE determines to suspend data transmission. When determining to suspend data transmission on the MBMS bearer, the MCE needs to send a new MCCH control signal to a base station in the MBSFN area, wherein an identity of the MBMS (TMGI) is not included in the new MCCH control signal. After receiving the new MCCH control signal, an eNB needs to send the received signal in an air interface. A UE receives the new MCCH control signal, and discovers that there is no identity of the MBMS (TMGI), so the UE believes that a MBMS service has been completed. If the UE still needs to receive the service, the UE needs to reestablish a point to point bearer.

In order to reduce data loss, before the MCE sends the new MCCH control signal to the base station, the MCE informs the MME of the pending decision first, and dose not send the new MCCH control signal to the base station.

The pending notification message includes an identity of a GCSE service (TMGI), or may also include a MBSFN identity or a SAI list.

In step 3A02, the MME sends the pending notification message to the GCSE server.

There may not be a directly connected interface between the MME and the GCSE server, so the message is forwarded to the GCSE server through other network node(s). For example, the MME forwards the message to the GCSE server through a SGW and a PGW, or the MME the message to the GCSE server through a MBMS GW and a BMSC.

The message includes the identity of the GCSE service (TMGI), or may also include the MBSFN identity or the SAI list.

The GCSE stores the identity of the GCSE service. The GCSE server confirms whether the MBMS data transmission can be suspended. When the MBMS data transmission can be suspended, it means that the point to point bearer needs to be established and the data of the GCSE service is sent through the point to point bearer.

As mentioned, the MME may also determine a bearer for sending the GCSE data. In such a case, step 3A02 is not executed, that is, the MME does not send the pending notification to the GCSE server. When the MME knows that the MCE determines to suspend a data bearer of an eMBMS, the MME may send the message to the GCSE server or the BM-SC, and inform the GCSE server or the BM-SC to send data by the point to point bearer.

In step 3A03, the GCSE server sends the message to the MME and establishes the point to point bearer to transmit the MBMS data, or begins to transmit the MBMS data on an existing point to point bearer.

There may not be directly connected interface between the MME and the GCSE server, so the message is forwarded to the GCSE server through other network node(s). For example, the MME forwards the message to the GCSE server through the SGW and the PGW, or the MME the message to the GCSE server through the MBMS GW and the BMSC. Communication between the GCSE server and the MME that may adopt a same way in which a message is forwarded through other node(s) is illustrated as below.

If the point to point bearer of the GCSE service has been established, the message includes an indication of starting transmission of a group communication identity of the GCSE service, wherein the identity may be the identity of the MBMS (TMGI). After receiving the message, the MME forwards the message to the base station. The base station may start to schedule the air interface resource for the UE, and to send the GCSE service data to the UE. The message sent to the base station by the MME may also be ignored. At this point, after obtaining the GCSE service data, the S-GW directly sends the data to the base station. After receiving the data, the base station starts allocate resource to the UE.

If the point to point bearer of the GCSE service is not established, the message is to request for establishing the point to point bearer, which includes the group communication identity of the GCSE service that may be the identity of the MBMS (TMGI), information of quality of service, etc.

In step 3A04, the point to point bearer is established, or data is transmitted on the existing point to point bearer.

If the point to point bearer of the GCSE service is not established, the MME initiates a process of establishing the point to point bearer. The establishing process is the same as the current process of establishing the point to point bearer, which is omitted herein.

If the point to point bearer of the GCSE service has been established, the data is sent from the SGW to the base station, and then sent from the base station to the UE.

In step 3A05, the MME reports the number of users to the GCSE server.

Because there is a UE that moves out of or moves in a control area of the MME, the number of the users that need to receive the GCSE service through the point to point bearer will change. The MME counts the number of the users. The MME reports the number of the users to the GCSE server, or reports the number of the users and the situation that the number of the users is greater than a threshold to the GCSE server when the number of the users is greater than the threshold. This step may be omitted if the GCSE may obtain location information of the UE.

In step 3A06, the GCSE server sends an indication message of restarting MBMS transmission to the MME.

The message includes an indication of retransmission of a group communication identity of the GCSE service which may be the identity of the MBMS (TMGI). As mentioned, the MCE may also determine the bearer for transmitting the GCSE data. In such a case, the step is omitted.

In step 3A07, the MME sends an indication message of restarting MBMS transmission to the MME.

The message includes an indication of retransmission of a group communication identity of the GCSE service which may be the identity of the MBMS (TMGI).

In step 3A08, the MCE configures MBMS control information for the base station.

The MCE sends the MBMS control information to the base station. The base station starts to send the MBMS control information in the air interface, and instructs the UE to start to receive the MBMS control information and receive the MBMS data on corresponding resource according to the MBMS control information. The process in the air interface is the same as the current process, which is omitted herein.

Figure 3B:
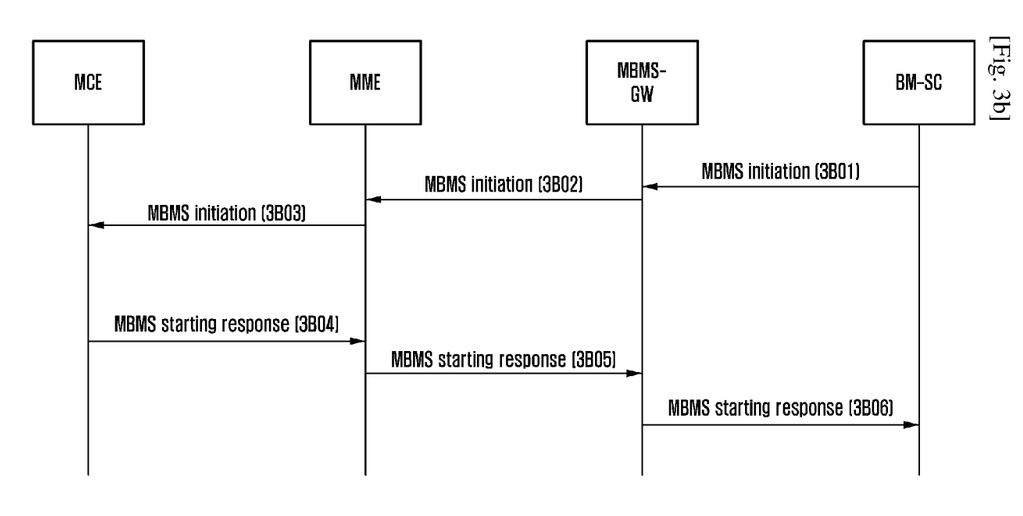
FIG. 3B is another schematic flowchart of a method for supporting transmission of a group service of a the present disclosure.

The present disclosure also provides another implementation method. In the method, user statistics function on the MCE is disabled, so that it is no need to start a mechanism of suspending transmission, to solve the problems existing in the current technologies. The method includes the following steps, as shown in FIG. 3B.

In step 3B01, the BM-SC sends a MBMS starting message to a MBMS-GW.

The message includes an identity of the MBMS (TMGI), quality of service (Qos) and a service scope. The message may also include indication information of the CGSE service. The indication information may be a GCSE indicator, or may be a GCSE group identity (GCSE Group Id), or an indication of not starting user statistics function, or other information. The indication information may also be a user identity in the GCSE group, such as IMSI or P-TMSI.

In step 3B02, the MBMS-GW sends the MBMS starting message to the MME.

The message includes the information described in the above step 3B01.

In step 3B03, the MME sends the message to the MCE.

The message includes the information described in the above step 3B01.

The MCE receives the message and knows that the GCSE service data is sent on the eMBMS bearer. The MCE does not start the user statistics function, so that the data transmission is not suspended. The message may also be sent to the base station by the MCE.

A message transmitted in steps 3B04 to 3B06 is a response to the MBMS starting message.

Figure 4:
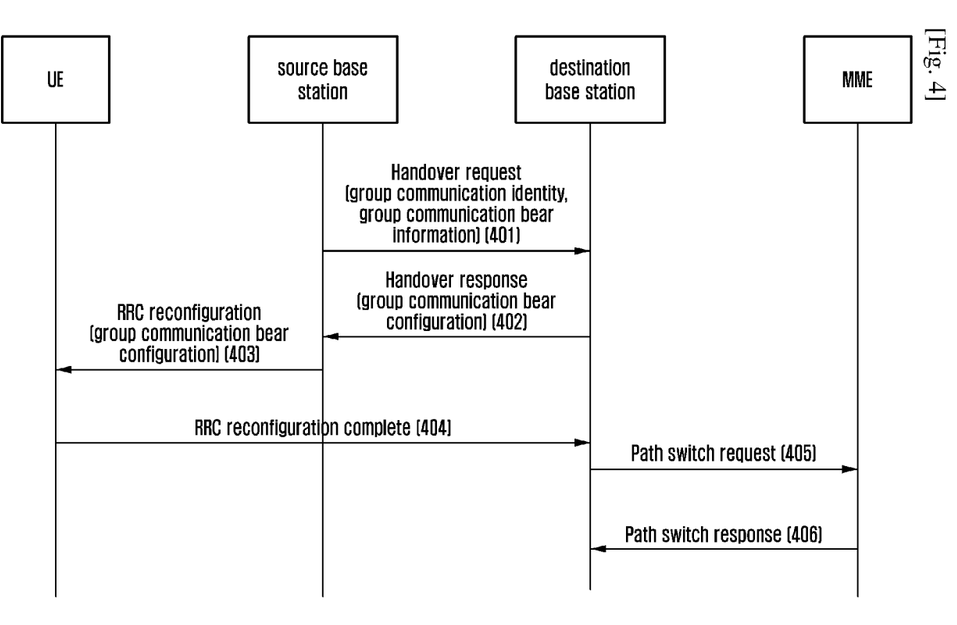
FIG. 4 is a schematic flowchart of a method for establishing a bearer of GCSE data in a handover process.

The present disclosure also provides a technical solution of establishing the GCSE data bearer in a handover process by information interaction between wireless nodes to reduce the risk of data loss caused by UE mobility. Even if the UE moves in different MBSFN areas or moves between a MBSFN area and a non-MBSFN area, continuity of data reception can also be maintained. FIG. 4 is a schematic flowchart of a method for establishing a bearer of GCSE data in a handover process. The process, as shown in FIG. 4, may include the following steps.

In step 401, a source station sends a destination base station a handover request, wherein the handover request carries bearer information of the group communication and a group communication identity.

The source base station determines to switch the UE to the destination base station. This determination refers to a measurement report sent by the UE. The source station sends the destination base station the handover request message including an identity of the UE on X2, an identity of the point to point bearer established on the source base station, Qos, capability of the UE, etc.

The message also includes a group communication identity established on the source base station which may be a group identity (GCSE Group Id) or may be the identity of eMBMS (TMGI) of data transmission. The message also includes bearer information of the group communication. When the MBMS bearer is taken as the bearer of the GCSE service, the bearer information includes the MBSFN identity; and when the GCSE service is sent on the point to point bearer, the bearer information includes a bearer identity.

In step 402, the destination base station sends the identity of group communication and bear configuration information to the source base station.

For the group communication service, if the destination base station sends the group communication service by using the MBMS bearer, the message includes broadcast information for configuring a MCCH and MBMS control information transmitting on the MCCH. Thus, after the UE is synchronized with the destination base station, the MBMS data may be received directly and the process of reading broadcast information and MBMS control information is omitted.

In step 403, the source base station sends a RRC reconfiguration message to the UE, wherein the message includes bearer configuration information of the group communication.

In step 404, the UE synchronized with the destination base station sends a RRC reconfiguration complete message to the destination base station.

In step 405, the destination base station sends a path switch request to the MME.

In step 406, the MME sends the path switch response to the destination base station.

At this point, the handover process is completed.

By the above process, the GCSE data bearer is established in the handover process, thus reducing the risk of data loss caused by UE mobility and maintaining the continuity of data reception.

The technical solution of the present disclosure is illustrated in detail below by several preferred embodiments.

A First Embodiment

The embodiment describes that a network establishes a bearer for a receiving group member of the group communication. There may be multiple receiving group members of the group communication, so that the eMBMS bearer may be established for the group members to save air interface resource. However, the time delay of establishing the eMBMS bearer is larger. In order to meet a requirement of the time delay, the network establishes the point to point bearer for the receiving group member. The eMBMS is established while the data is sent on the the point to point bearer. After the eMBMS bear is established successfully, the point to point bear is released or maintained. When the eMBMS bearer is suspended, the data of the group communication may be transmitted with the point to point bearer.

Figure 5:
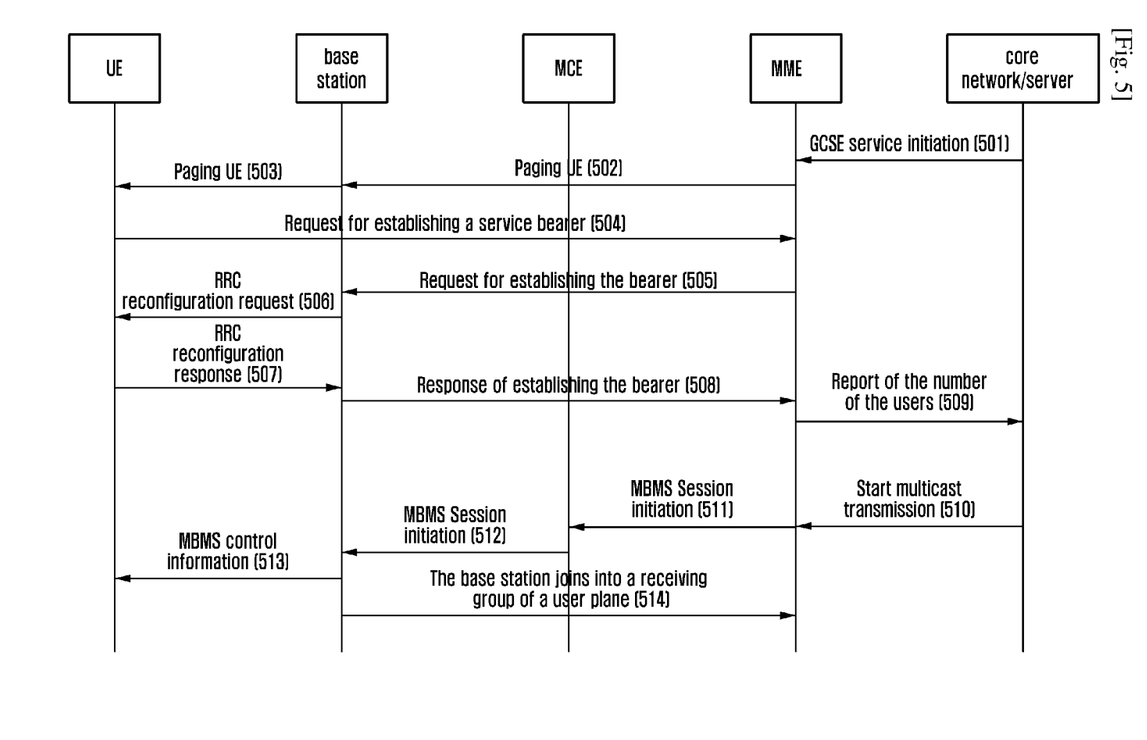
FIG. 5 is a schematic diagram of an implementation process of a first embodiment of the present disclosure.

FIG. 5 is a schematic diagram of an implementation process of the first embodiment of the present disclosure, of which the establishment process may include the following steps.

In step 501, the GCSE sends a GCSE service starting message to the MME.

Suppose that a GCSE server receives a request for sending the group members. The GCSE is asked to establish GCSE group communication with the receiving group member. The GCSE server stores information of the group member including the group identity (GCSE Group Id), the eMBMS identity (TMGI) used in the group communication, the identity of the group member, location of the member group, etc. The GCSE sends the message to the MME, wherein the message includes the identity(s) of the group communication, which may be the Group Id or the eMBMS service identity (TMGI), or may include both of the two identities. The message may also include the identity of the group member such as the IMSI or the P-TMSI of the UE. After sending an E-RAB establishment message, the MME performs different operations according to a UE state.

If the UE is in a connected mode, the MME sends the E-RAB establishment message to ask for establishment of the point to point bearer of which the process is the same as the current process of the bearer establishment.

If the UE is in an idle mode, the MME sends a paging message in step 502 to the base station, the base station send the paging message in step 503 in the air interface. The UE in the idle mode is taken as an example in the embodiment.

In step 504, the UE sends a service request message to the MME, and the message forwarded to the MME through the base station.

The service request message is the same as the current message of which detailed description is omitted herein.

In step 505, the MME sends a bearer establishment request message to the base station.

The bearer establishment request message is the same as the current message of which detailed description is omitted herein.

In step 506, the base station sends a RRC reconfiguration request to the UE.

The RRC reconfiguration request message is the same as the current message of which detailed description is omitted herein.

In step 507, the UE sends a RRC reconfiguration response to the UE.

The RRC RC reconfiguration response message is the same as the current message of which detailed description is omitted herein.

In step 508, the base station sends a bearer establishment response message to the base station.

The bearer establishment response message is the same as the current message of which detailed description is omitted herein.

In step 509, the MME reports the number of the users to the base station.

Because there is a UE that moves out of or moves in a control area of the MME, the number of the users that need to receive the GCSE service through the point to point bearer will change. The MME counts the number of the users. The MME reports the number of the users to the GCSE server, or reports the number of the users and the situation that the number of the users is greater than a threshold to the GCSE server when the number of the users is greater than the threshold. This step may be omitted, if the GCSE may obtain location information of the UE in other ways such as an application layer, or the GCSE server has been able to obtain a location of a group user by the report of the location information of the UE.

In step 510, the GCSE server sends the MBMS starting message to the MME.

The GCSE determines to send data of the group communication on the eMBMS bearer. The GCSE has obtained the identity of the eMBMS carrying the group communication. The MBMS starting message received by the MME includes the TMGI, Qos of the service, a service scope, a transport layer address of the MBMS GW and an address of IP multicast.

In step 511, the MME sends the MBMS starting message to the MCE.

The message received by the MCE includes the TMGI, the Qos of the service, the service scope, the transport layer address of the MBMS GW and the address of IP multicast.

In step 512, the MCE configures the MBMS control information for the base station.

The MCE sends the base station the MBMS starting message including the TMGI, the Qos of the service, the service scope, the transport layer address of the MBMS GW and the address of IP multicast, and the MCE sends the MBMS control information to the base station. The MBMS control information which needs to be transmitted on a MCCH channel in the air interface includes the TMGI of the eMBMS service and configuration information of a physical multicast channel (PMCH).

In step 513, the base station starts to send the MBMS control information in the air interface.

The base station instructs the UE to start to receive the MBMS control information, and sends the MBMS control information sent by the MCE on the MCCH. The UE obtains configuration information of the PMCH according to the received MBMS control information, and receives the MBMS data on corresponding resource.

In step 514, the base station may receive data of the user plane after joining in an IP multicast transmission group.

At this point, the process of the first embodiment is ended.

A Second Embodiment

Figure 6:
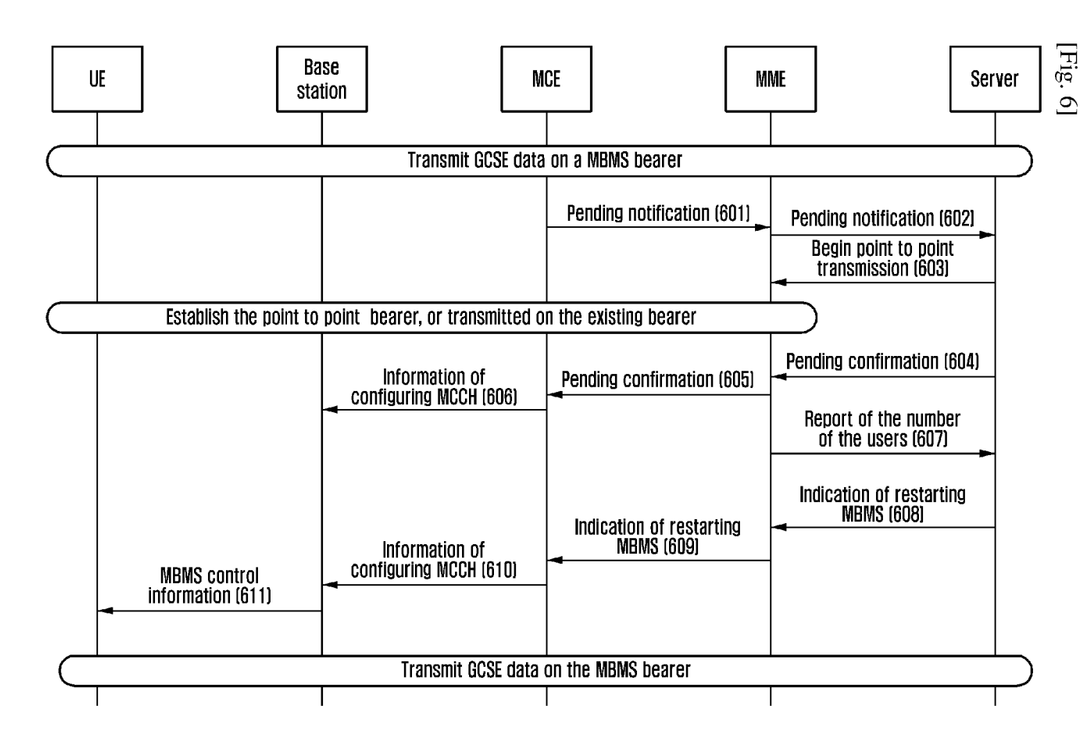
FIG. 6 is a schematic diagram of an implementation process of a second embodiment of the present disclosure.

The embodiment describes that the GCSE data is sent by utilizing the point to point bearer when the GCSE server determines the eMBMS service is suspended in the MCE, and the GCSE server may let the MCE restart the eMBMS transmission. FIG. 6 is a schematic diagram of an implementation process of the second embodiment of the present disclosure, of which the establishment process may include the following steps.

In step 601, the MCE informs the MME that the transmission of the MBMS data is suspended. The MCE sends the pending notification to the MME.

The GCSE data is sent on the eMBMS bearer before the step 601.

The MCE counts the number of the users that receives data in a MBSFN area. When the number of the users is less than a threshold, the MCE determines to suspend data transmission. The MCE needs to send a new MCCH control signal to a base station in the MBSFN area, wherein the identity of the MBMS (TMGI) is not included in the new MCCH control signal. After receiving the new MCCH control signal, the eNB needs to send the new control signal in an air interface. The UE receives the new MCCH control signal, and discovers that there is no identity of the MBMS (TMGI), so the UE believes that the MBMS service has been completed. If the UE still needs to receive the service, the UE needs to reestablish a point to point bearer.

In order to reduce the data loss, before the MCE sends the new MCCH control signal, the MCE informs the MME of the pending decision first, and dose not send the new MCCH control signal to the base station.

The pending notification message includes the identity of the GCSE service (TMGI), or may also include the MBSFN identity or the SAI list.

In step 602, the MME sends the pending notification message to the GCSE server.

There may not be a directly connected interface between the MME and the GCSE server, so the message is forwarded to the GCSE server through other network node(s). For example, the MME forwards the message to the GCSE server through the SGW and the PGW, or the MME the message to the GCSE server through a MBMS GW and a BMSC.

The message includes the identity of the GCSE service (TMGI), or may also include the MBSFN identity or the SAI list.

The GCSE stores the identity of the GCSE service. The GCSE server confirms whether the MBMS data transmission can be suspended. When the MBMS data transmission can be suspended, it means that the point to point bearer needs to be established and the data of the GCSE service is sent through the point to point bearer.

In step 603, the GCSE server sends the message to the MME, and informs the MME to start to transmit the MBMS data on the point to point bearer.

If the point to point bearer of the GCSE service has been established, the message includes an indication of starting transmission of the group communication identity of the GCSE service, wherein the identity may be the identity of the MBMS (TMGI). After receiving the message, the MME forwards the message to the base station. The base station may start to schedule the air interface resource for the UE, and to send the GCSE service data to the UE.

If the point to point bearer of the GCSE service is not established, the message includes the GCSE group communication identity that may be the identity of the MBMS (TMGI) and the information of quality of service.

In step 604, the GCSE server sends a pending acknowledgement to the MME.

In step 605, the MME forwards the pending acknowledgement to the MCE.

In step 606, the MCE configures the MBMS control information for the base station.

The MCE sends the MBMS control information to the base station. The base station starts to send the MBMS control information in the air interface, and instructs the UE to start to receive the MBMS control information and receive the MBMS data on corresponding resource according to the MBMS control information. The process in the air interface is the same as the current process, which is omitted herein.

In step 607, the MME reports the number of users to the GCSE server.

Because there is a UE that moves out of or moves in a control area of the MME, the number of the users that need to receive the GCSE service through the point to point bearer will change. The MME counts the number of the users. The MME reports the number of the users to the GCSE server, or reports the number of the users and the situation that the number of the users is greater than a threshold to the GCSE server when the number of the users is greater than the threshold.

In step 608, the GCSE server sends a message of restarting MBMS transmission to the MME.

In step 609S, the MME forwards the message of restarting MBMS transmission to the MCE.

In step 610, the MCE configures the MBMS control information for the base station.

The MCE sends the base station the MBMS starting message including the TMGI, a Session Id, the service scope, the transport layer address of the MBMS GW and the address of IP multicast, and the MCE sends the MBMS control information to the base station. The MBMS control information which needs to be transmitted on the MCCH channel in the air interface includes the TMGI of the eMBMS service and the configuration information of the physical multicast channel (PMCH).

In step 611, the base station starts to send the MBMS control information in the air interface.

The base station instructs the UE to start to receive the MBMS control information, and sends the MBMS control information sent by the MCE on the MCCH channel. The UE obtains the configuration information of the PMCH according to the received MBMS control information, and receives the MBMS data on the corresponding resource.

At this point, the process of the second embodiment is ended.

A Third Embodiment

Figure 7:
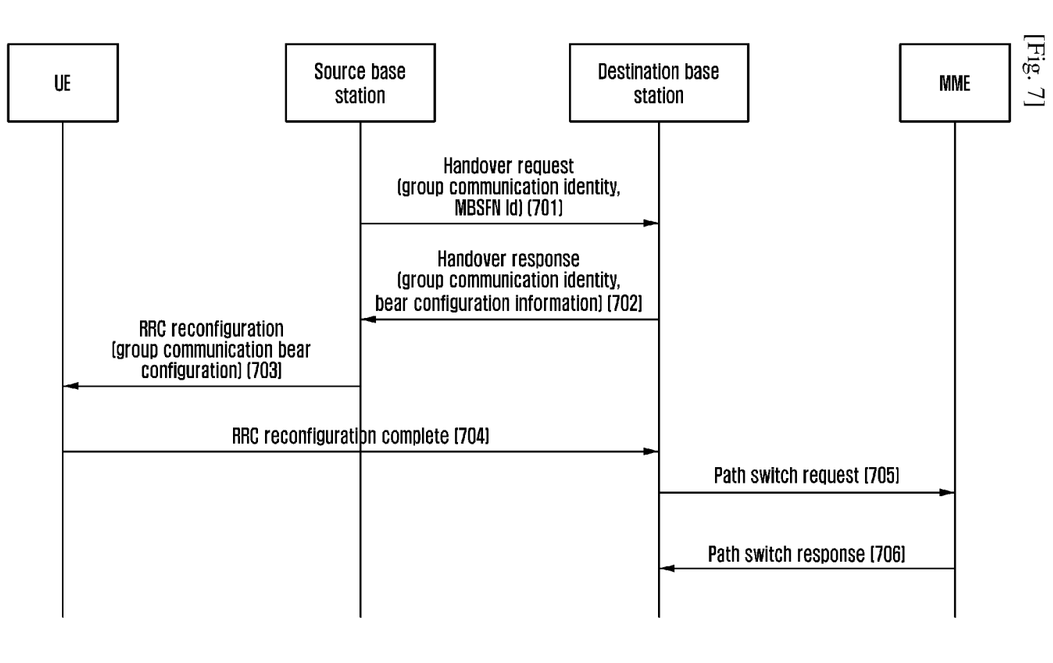
FIG. 7 is a schematic diagram of an implementation process of a third embodiment of the present disclosure.
Figure 8:
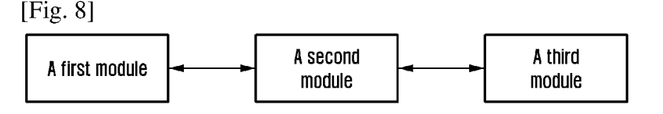
FIG. 8 is a composite structure diagram of a preferred base station of the present disclosure.

The embodiment describes that the UE is switched from the MBSFN area to the outside of the MBSFN area, and the GCSE data is transmitted on the point to point bearer in the destination base station. Or, the UE is switched form one MBSFN area to a different MBSFN area. FIG. 7 is a schematic diagram of an implementation process of the third embodiment of the present disclosure, which may include the following steps.

In step 701, the source base station sends the handover request to the destination base station.

The source base station determines to switch the UE to the destination base station. This determination refers to a measurement report sent by the UE. The source station sends the destination base station the handover request message including the identity of the UE on X2, the identity of the point to point bearer established on the source base station, Qos, capability of the UE, etc.

The message also includes the group communication identity established on the source base station which may be the group identity (GCSE Group Id) or may be the identity of eMBMS (TMGI) of data transmission or the MBSFN identity of the group communication. According to some implementation methods, the message may also include the Qos information of the service, the IP address of the MBMS GW and the multicast address.

In step 702, the destination base station sends a handover response message to the source base station.

For the group communication service, if the destination base station sends the group communication service by using the MBMS bearer, the message includes the broadcast information for configuring the MCCH and the MBMS control information transmitting on the MCCH. Thus, after the UE is synchronized with the destination base station, the MBMS data may be received directly and the process of reading the broadcast information and the MBMS control information is omitted.

If the destination base station sends the GCSE data on the point to point bearer, there may be several implementation methods.

In the first method, the destination base station does not establish the point to point bearer in advance, because the destination base station has not obtained information such as the Qos information of the service that is necessary for establishing the point to point bearer. The handover response message sent by the destination base station includes a bear identity used by a common service and the bearer configuration information that needs to be sent to the UE.

In the second method, if the destination base station obtains the Qos information of the service from the source base station, as well as multicast address information of the MBMS GW, the destination base station may add the multicast address of the MBMS GW and receive the data from the MBMS GW. The handover response message sent by the destination base station includes a bear identity used by the GCSE and the configuration information of the GCSE bearer that needs to be sent to the UE.

In step 703, the source base station sends the RRC reconfiguration message to the UE, wherein the message includes bearer configuration of the group communication.

In step 704, the UE synchronized with the destination base station sends the RRC reconfiguration complete message to the destination base station.

In step 705, the destination base station sends the path switch request to the MME.

In step 706, the MME sends the path switch response to the destination base station.

At this point, the process of the third embodiment is ended.

A Fourth Embodiment

The embodiment describes that the UE is switched from the non-MBSFN area to the MBSFN area, and the GCSE data is transmitted on the point to point bearer in the destination base station. A schematic diagram of an implementation process of the embodiment is the same of that shown in FIG. 7, which may include the following steps.

In step 701, the source base station sends the handover request to the destination base station.

The source base station determines to switch the UE to the destination base station. This determination refers to a measurement report sent by the UE. The source station sends the destination base station the handover request message including the identity of the UE on X2, the identity of the point to point bearer established on the source base station, Qos, capability of the UE, etc.

The message also includes the group communication identity established on the source base station which may be the group identity (GCSE Group Id) or may be the identity of eMBMS (TMGI) of data transmission. The message also includes the identity of the group communication.

In step 702, the destination base station sends the handover response message to the source base station.

For the group communication service, if the destination base station sends the group communication service by using the MBMS bearer, the message includes the broadcast information for configuring the MCCH and the MBMS control information transmitting on the MCCH. Thus, after the UE is synchronized with the destination base station, the MBMS data may be received directly and the process of reading the broadcast information and the MBMS control information is omitted.

In step 703, the source base station sends the RRC reconfiguration message to the UE, wherein the message includes the bearer configuration of the group communication.

In step 704, the UE synchronized with the destination base station sends the RRC reconfiguration complete message to the destination base station.

In step 705, the destination base station sends the path switch request to the MME.

In step 706, the MME sends the path switch response to the destination base station.

At this point, the process of the fourth embodiment is ended.

The above are only preferred embodiments of the present disclosure, and are not for use in limiting the present invention. Any modification, equivalent replacement or improvement made under the spirit and principles of the present invention should be covered within the protection scope of the present invention.

The invention claimed is:

1. A method for establishing a bearer of group call system enabler (GCSE) data, comprising:
   sending, by a source base station, to a destination base station, a handover request, wherein the handover request carries a group communication identity for identifying a group communication established by a user equipment (UE) on the source base station and bearer information of the group communication;
   receiving, by the source base station, from the destination base station, a handover response message including the group communication identity and bearer configuration information for configuring a bearer of the group communication between the UE and the destination base station; and
   sending, by the source base station, to the UE, a radio resource control (RRC) reconfiguration message,
   wherein the RRC reconfiguration message includes the bearer configuration information for configuring the bearer of the group communication between the UE and the destination base station, and
   wherein the handover response message further includes broadcast information for configuring a multicast control channel (MCCH) and multimedia broadcast multicast service (MBMS) control information transmitting on the MCCH, in case that the destination base station sends service data of the group communication by using an MBMS bearer.

2. The method according to claim 1, wherein the group communication identity is a GCSE group identity (Id) or a temporary mobile group identity (TMGI).

3. The method according to claim 1, wherein the bearer information of the group communication sent to the destination base station by the source base station is a multicast/broadcast over a single frequency network (MBSFN) identity in case that the source base station sends service data of the group communication on the MBMS bearer; and the bearer information of the group communication sent to the destination base station by the source base station includes a bearer identity in case that the source base station sends service data of the group communication on a point to point bearer.

4. A base station, comprising:
   a transceiver; and
   a controller coupled with the transceiver and configured to:
      control the transceiver to send, to a destination base station, a handover request, wherein the handover request carries a group communication identity for identifying a group communication established by a user equipment (UE) on the base station and bearer information of the group communication;
      control the transceiver to receive, from the destination base station, a handover response message including the group communication identity and bearer configuration information for configuring a bearer of the group communication between the UE and the destination base station; and
      control the transceiver to send, to the UE, a radio resource control (RRC) reconfiguration message,
   wherein the RRC reconfiguration message includes the bearer configuration information for configuring the bearer of the group communication between the UE and the destination base station, and
   wherein the handover response message further includes broadcast information for configuring a multicast control channel (MCCH) and multimedia broadcast multicast service (MBMS) control information transmitting on the MCCH, in case that the destination base station sends service data of the group communication by using an MBMS bearer.

* * * * *